INVENTOR,
PAUL W. UBER

BY

J. Irvin McCoy
Earl Levy
ATTORNEYS

TAPE RECORDER

Filed Sept. 6, 1967 2 Sheets-Sheet 2

INVENTOR,
PAUL W. UBER

BY

Afrus & Cory
Carl Levy
ATTORNEYS

United States Patent Office 3,460,781
Patented Aug. 12, 1969

3,460,781

TAPE RECORDER

Paul W. Uber, Bowie, Md., assignor to the United States of America as represented by the Administrator of the National Aeronautics and Space Administration Filed Sept. 6, 1967, Ser. No. 666,551
Int. Cl. G11b *15/44*
U.S. Cl. 242—192 4 Claims

ABSTRACT OF THE DISCLOSURE

A tape recorder including a capstan having a resilient, deformable cylindrical drive surface adapted to directly couple and simultaneously drive both magnetic tape takeup and supply reels by frictional surface engagement with the outer layer of magnetic tape carried on the periphery of each reel. The takeup and supply reels are supported on slidably mounted carriages and nonaccumulative force springs are provided to control movement of the carriages with respect to the capstan, so as to maintain a greater contact force between the capstan and the magnetic tape carried on the periphery of the takeup reel than on the magnetic tape carried on the periphery of the supply reel, whereby magnetic tape during transfer between reels is subjected to a desired tension.

The invention described herein was made by an employee of the United States Government and may be manufactured and used by or for the Government for governmental purposes without the payment of any royalties thereon or therefor.

SUMMARY

The present invention relates to recorder and more particularly to tape recorder characterized by low power consumption, simplicity of design and resistance to operational failure under high stress conditions.

Direct drive mechanisms for magnetic tape recorders wherein the driving force is imparted by a capstan in contact with the outermost tape layer on one of the recorder reels are well known as evidence by the patent to Iida 3,161,361. A particular disadvantage of mechanisms of this type includes the requirement that there be provided a friction or like brake for the supply reel, which brake tends to increase the recorder's power consumption and is subject to failure due to wear and environmental conditions.

In attempting to design a recorder having a low power consumption, it has been proposed to drive both supply and takeup reels so as to avoid friction braking of the supply reel, by various means such as the utilization of a driven endless band or belt which passes about the periphery of each reel. However, the peripheral belts normally employed are subject to fatigue failure and exhibit nonuniform strain characteristics along their length, which results in the nonuniform driving of the reels.

Accordingly, it is an object of the present invention to provide a tape recorder not subject to the disadvantages mentioned above.

It is a specific object of the present invention to provide a recorder having minimum power consumption characterized by the utilization of a single capstan for simultaneously driving both supply and takeup reels by surface engagement with the outermost layer of magnetic tape on each reel.

It is a further object of the present invention to provide a tape recorder having a single capstan adapted to simultaneously drive both a supply and takeup reel in such a manner that the magnetic tape passing between the reels is subject to a predetermined control tension.

Still further, it is an object to provide a tape recorder particularly adapted for use as an information recorder under high stress conditions encountered, for instance, in rocket and high altitude balloon test.

These and other objects of the present invention will be more fully understood with reference to the following description taken with the accompanying drawings in which.

Figures 1, 3:
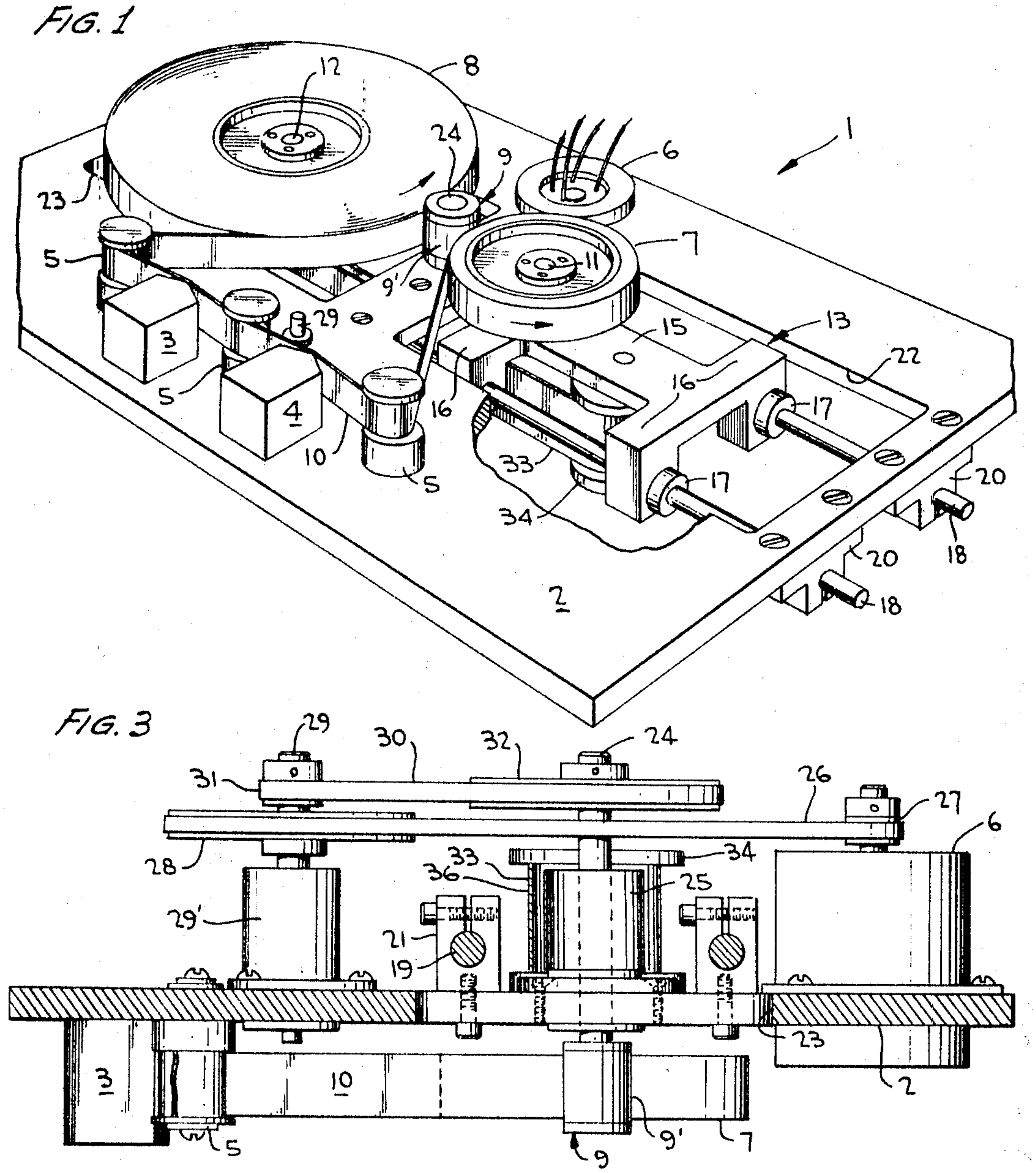
FIGURE 1 is a perspective view of the tape recorder of the present invention.
FIGURE 3 is an inverted vertical sectional view taken generally along the line 3—3 in FIGURE 2, having portions broken away for clarity.

The tape recorder according to the present invention is generally designated as 1 in the figures and includes a base plate 2, which is adapted to support a conventional recording and reproduction head 3, erasing head 4, tape guides 5 and drive motor 6.

To facilitate understanding of the present invention, it will be understood at the outlet that in the preferred embodiment to be described, tape recorder 1 only possesses a recording capability. Thus, the tape reels will be identified according to function as magnetic tape supply and takeup reels 7 and 8, respectively. Also, it will be understood that in the preferred embodiment, reels 7 and 8 are directly coupled and simultaneously driven by a motion transmitting member, such as capstan 9, disposed in frictional surface engagement with the outer layer of magnetic tape carried on each reel, whereby upon rotation of capstan 9, magnetic tape 10 is transferred between the reels along the path shown in FIGURE 1 as being defined by tape guides 5 and heads 3 and 4.

Figure 2:
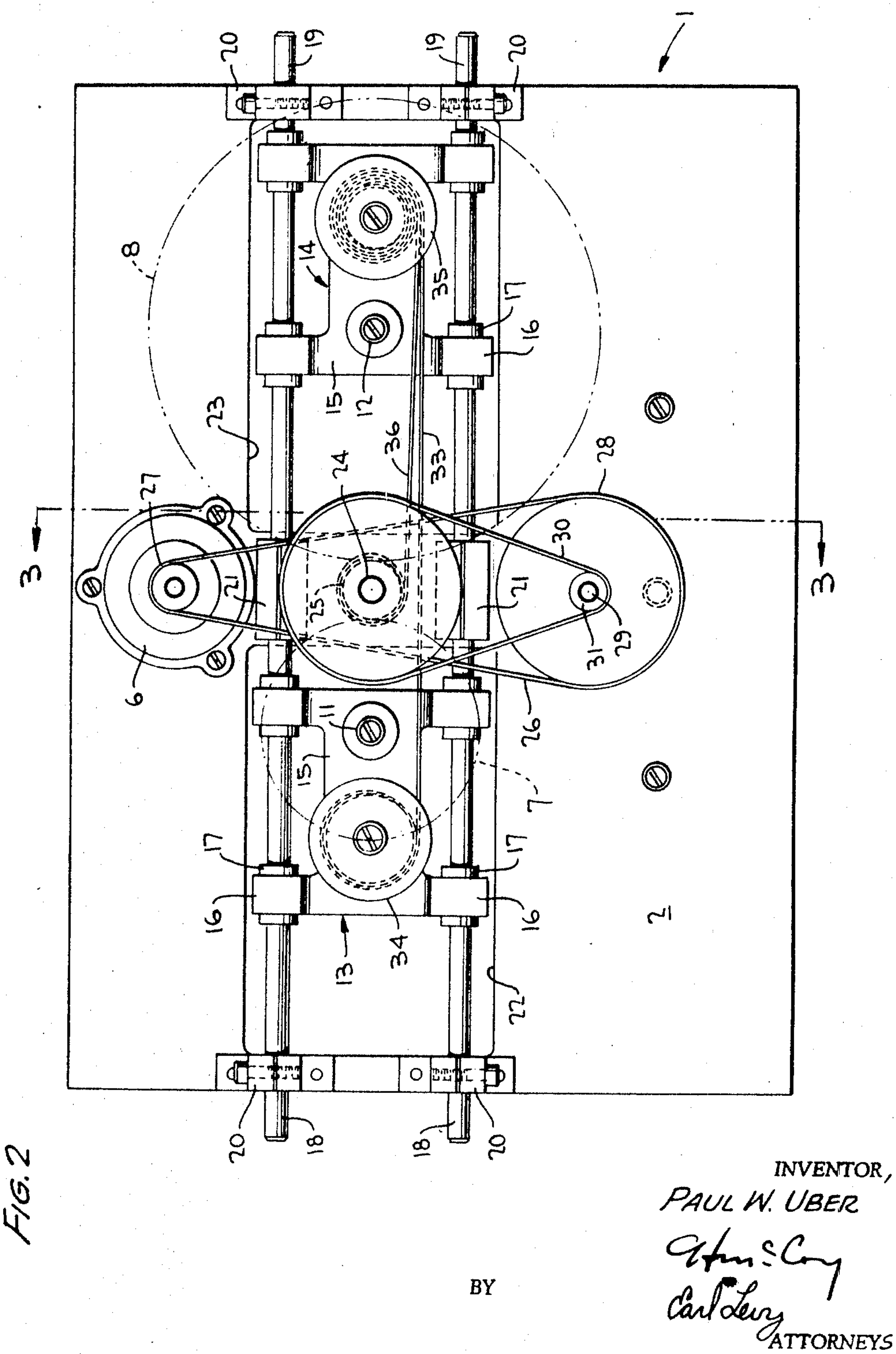
FIGURE 2 is a bottom plan view of the tape recorder shown in FIGURE 1.

Now referring particularly to FIGURES 1 and 2, it will be seen that supply reel 7 and takeup reel 8 are rotatably supported on shafts 11 and 12, which are in turn mounted on reel carriages, generally designated as 13 and 14, respectively. Reel carriages 13 and 14 are preferably of identical construction and each includes an integrally formed central web portion 15 and four laterally extending arm portions 16, which are each bored to receive a cylindrical antifriction bearing 17. Bearing 17 and thus reel carriages 13 and 14 are slidably supported on pairs of spaced parallel guide shafts 18 and 19, which are mounted on the under surface of base plate 2 by suitable end brackets 20 and central brackets 21.

Again referring to FIGURES 1 and 2, it will be seen that base plate 2 is provided with generally rectangular cutouts 22 and 23 in order to permit unobstructed sliding movement of reel carriages 13 and 14 and thus supply and takeup reels 7 and 8 with respect to capstan 9. Also, it will be seen that in the embodiment illustrated, the rotational axis of the capstan and takeup reels are parallel and disposed within a common plane, and that sliding movement of carriages 13 and 14 is in a direction parallel to such plane.

Figure 4:
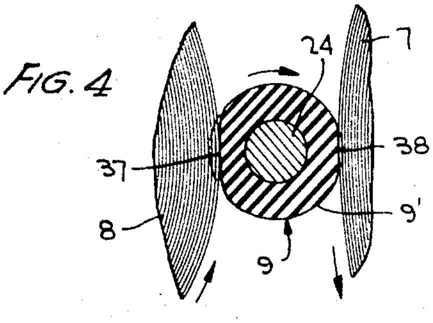
FIGURE 4 is a fragmentary view illustrating the manner in which the surface of the capstan is deformed during driving engagement with the outer layer of magnetic tape on the supply and takeup reels.

Capstan 9 is shown in FIGS. 1, 3 and 4 as being in the form of a sleeve 9' formed from a resilient deformable material, such as rubber, which is fixed to one end of a drive shaft 24. Shaft 24 is adapted to freely pass through a bore opening, not shown, provided in base plate 2 and be rotatably supported within a cylindrical bearing housing 25, which is suitably fixed to the under surface of base plate 2. In FIGURES 2 and 3 capstan 9 is shown as being driven by motor 6 through a transmission including a seamless elastic drive belt 26, which passes from motor shaft pulley 27 to a first or enlarged dismeter pulley 28 affixed to idler shaft 29, and a seamless elastic drive belt 30, which passes from a second or reduced diameter pulley 31 affixed to shaft 29 to pulley 32, which is a ffixed to capstan drive shaft 24. Idler shaft 29 is journaled within a bearing housing 29', suitably affixed to the under surface of base plate 2. For purposes of the present invention, motor 6 may be electric or spring powered.

In FIGURE 2, reel carriages 13 and 14 are shown as being coupled together by means of a spring 33, which is freely coiled at each end thereof around spools 34 and 35, which are affixed to the under surfaces of reel carriages 13 and 14, respectively. Preferably, spring 33 is a nonaccumulative force type spring, which has been sold under the trademark Neg'ator, and is characterized by its ability, when the coils thereof are mounted for free rotation, to resist withdrawal from the coils with a force which is constant regardless of the spring length withdrawn. Thus, spring 33 provides a constant force tending to bias the reel carriages towards one another, so as to maintain an initial equal and constant contact force between the outer layer of magnetic tape on each of the reels and capstan 9. This initial force is independent of the amount of tape accumulated on the respective reels. The initial or basic contact force provided by spring 33 is employed to insure minimum driving engagement between the capstan and reels and is determined by the maximum momentary unbalancing force which the recorder is expected to encounter during use. For instance, if a tape reel when fully loaded weighs ½ pound and the recorder is expected to encounter during use, as for instance in a rocket test, a force of about 10 G's in the direction of sliding movement of the reel carriages, then a spring force slightly greater than five pounds would be required to maintain both reels in driving engagement with the capstan.

Again referring to FIGS. 2 and 3, it will be seen that a second nonaccumulative force spring 36 is employed to increase or provide an additional contact force between takeup reel 8 and capstan 9. One end of spring 36 is coiled about takeup carriage spool 35, while the other end thereof is coiled about capstan drive shaft housing 25. The effect produced by springs 33 and 36 is best illustrated in FIG. 4, wherein the portion 37 of capstan 9 in engagement with takeup reel 8 is shown as being subjected to a greater degree of deformation than capstan surface portion 38 in contact with supply reel 7.

For purposes of the present invention, the end coils of springs 33 and 36 may be either loosely coiled or be affixed to freely rotatable sleeves, not shown, carried respectively on spools 34, 35 and housing 25. Also, while springs 33 and 36 are shown as being loosely coiled about each other on spool 35, it will be apparent that the coils of the respective springs may be axially spaced, particularly in those instances wherein it is desirable to disconnect spring 36 from reel carriage 14 and attach such spring for movement with reel carriage 13 so as to reverse the functions of the carriages and permit recorder 1 to possess both recording and playback capabilities. Alternatively, an additional force spring similar to spring 36 may be provided one for each carriage and selectively connected for movement therewith by suitable means, not shown.

From the foregoing it will be apparent that in operation, full supply and empty takeup reels are mounted upon supporting shafts 11 and 12 and magnetic tape threaded therebetween. Positioning of the reels and threading of the tape may be facilitated by providing suitable latch means, not shown, to retain carriages 13 and 14 in full right and full left positions, as viewed in FIG. 1, against the restoring bias of springs 33 and 36. Such latches additionally serve to space the tape reels from the driving capstan to prevent setting or permanent deformation thereof during long periods between recorder operation. Thereafter, the latches may be released to permit springs 33 and 36 to draw the carriages towards each other and the outermost layer of magnetic tape carried upon the respective reels into surface engagement with the resilient surface of the driving capstan. Suitable switch means, also not shown, may then be operated to energize the capstan drive motor and effect driving rotation of the capstan, in a clockwise direction, as viewed in FIG. 1, to effect transfer of the tape to the takeup reel. As tape transfer progresses, carriages simultaneously slide to the left, also as viewed in FIG. 1, to compensate for the changing amounts of tape on the respective reels while maintaining such reels in driving engagement with the capstan.

It has been found that by employing a resilient surfaced capstan disposed in driving engagement with the magnetic tape on the respective reels and providing additional spring 36 to effect uneven deformation of the capstan, the speeds of the supply and takeup reels may be varied to achieve a controlled tension of the magnetic tape during transfer between reels.

The phenomena of tape tension obtained by employing a single resilient surfaced capstan to simultaneously drive takeup and supply reels will be readily understood by considering that the magnetic tape, when wound on the supply and takeup reels, forms relatively hard cylindrical surfaces. It may be shown that for deformations of the resilient surface of the capstan sufficient to avoid gross slippage in rolling, the surface-speed ratio of the undeformed capstan vs. the hard surface presented by the tape, $v_R/v_H$, is less than one and decreases with increasing deformation of the capstan according to a non-linear relationship. For reference, see ASME publication 61–SA–67, "On the Kinematics of Rubber-Covered Cylinders Rolling on a Hard Surface," by George N Sandor, June 1961. Thus, it will apparent that if the deformation of the capstan due to surface contact with the takeup reel is greater than that due to engagement with the supply reel, the surface speed of the takeup reel will be greater than that of the supply reel, as a function of the relative deformation. This phenomena may be domenstrated by assuming for purposes of illustration that the ratio $v_R/v_H$ for the supply reel is 0.9045 and the ratio $v_R/v_H$ for the takeup reel is 0.9000. Since $v_R$ is a constant, it can be shown that $v_H$ (takeup reel)/$v_H$ (supply reel is equal to 1.005. If it is further assumed that the supply reel speed or peripheral velocity is 10 inches/second and that the tape length between reels is 10 inches, it may be determined that the speed of the takeup will be 10.05 inches/second, and that the length of tape passing between the reels will experience a 0.5% increase in length. If it is further assumed that for a given ¼" tape, a 1% elongation requires about 0.7 pound tension, the 0.5% elongation will result in a transferred tape tension of about 5.6 ounces. This degree of tension is sufficient to insure proper tape transfer and prevent the formation of undesirable slack loops in the transferred tape. Due to the constant force imparted by the nonaccumulative force springs, irregular tension and accompanying uneven winding of the tape during normal use is effectively prevented.

While a preferred embodiment of the present invention has been described wherein the tape reels are supported on slidably mounted and aligned carriages adapted to position the reels in driven contact with diametrically opposite sides of the driving capstan, various alternative embodiments are anticipated. Exemplatory of such embodiments are to movably mount the tape reels one above the other for engagement with the same side of the driving capstan; to support each tape reel on a pivot arm carriage which is spring loaded into contact with the driving capstan; to mount the driving capstan on a carriage for movement with respect to fixed axis tape reels; or to employ a fixed axis tape reel to drive a movably mounted tape reel through a movably mounted motion transmitting capstan.

Further, while in the discussion reference has been made to positively driving the capstan directly by a suitable motor, the term positively driving or positively driven as used in the claims is meant to include an embodiment wherein additional alternative means are employed to drivingly engage the magnetic tape, for instance tape passing from the supply reel, whereby the supply reel is positively driven by the forwarded tape and the takeup reel is driven through an idler capstan or motion transmitting member.

Also, while a tape recording machine having only recording capabilities has been described in detail, it will be apparent that the machine may function solely as a play-back or erasing machine, and by providing additional force spring means for each tape reel accompanied by suitable means to selectively disconnect such springs a machine having both recording and play-back capabilities may be obtained. Further, the recorder mechanism disclosed may be employed as a perforated paper tape recorder with an appropriate transducer or photo pick up head replacing the magnetic tape recording and reproduction head. Accordingly, the above discussed alternative embodiments, as well as additional modifications of the recorder of the present invention, will become apparent to one skilled in the art in view of the foreging description.

What is claimed is:

1. In a recorder of the type for supporting a pair of reels of recording tape forming supply and takeup reels, the improvement comprising: means for supporting said supply reel; means for supporting said takeup reel; annular rotating tape drive means having resilient surface portions to contact and rotate said supply reel and takeup reels to feed tape from said supply to said takeup reel; and positioning means including a first nonaccumulative force type spring having its ends fixed to said supporting means, thereby biasing each of said supporting means for movement with respect to said drive means to maintain said drive means in surface engagement with said recording tape on said reels, and a second nonaccumulative force type spring having one end fixed to said means for supporting said takeup reel and the other end fixed adjacent said drive means, thereby biasing said takeup reel for movement with respect to said drive means to develop a greater compressive force between said takeup reel and said surface poritons than between said supply reel and said surface portions for tensioning said tape.

2. The apparatus according to claim 1, wherein said drive means and said reels are mounted for rotation about three parallel spaced axis and supply and takeup reel supporting means further includes first and second movably mounted carriages, said drive means being rotatably mounted at a fixed point and said reels being mounted respectively one on each of said carriage for movement therewith relative to said fixed point.

3. The combination according to claim 2, wherein said carriages are slidably mounted, the rotational axis of said drive means and said reels are disposed in a common plane, and sliding movement of said carriages is in a direction parallel to said plane.

4. The combination according to claim 2, wherein said drive means is adapted to be positively driven and is mounted at said fixed point.

References Cited

UNITED STATES PATENTS

| | | | |
|---|---|---|---|
| 2,605,056 | 7/1952 | De Kanski et al. | 242—54.1 |
| 2,733,069 | 1/1956 | Frost et al. | 242—55.14 X |
| 3,252,669 | 5/1966 | Geri | 242—55.13 |
| 3,294,332 | 12/1966 | Miville et al. | 242—55.12 |
| 3,370,803 | 2/1968 | Newell | 242—55.12 |
| 3,370,804 | 2/1968 | Peyton | 242—55.12 |

GEORGE F. MAUTZ, Primary Examiner

U.S. Cl. X.R.

242—55